United States Patent
Huang et al.

(10) Patent No.: US 7,352,669 B2
(45) Date of Patent: Apr. 1, 2008

(54) METHOD AND DEVICE FOR DISC ROTATION CONTROL IN AN OPTICAL STORAGE SYSTEM BASED ON DETECTED EXTENT OF DISC WARPING

(75) Inventors: Ping-Kai Huang, Chung-Ho (TW); Cheng-Pin Wang, Chung-Ho (TW)

(73) Assignee: Micro-Star International Co., Ltd., Chung-Ho (TW)

( * ) Notice: Subject to any disclaimer, the term of this patent is extended or adjusted under 35 U.S.C. 154(b) by 540 days.

(21) Appl. No.: 10/889,736

(22) Filed: Jul. 13, 2004

(65) Prior Publication Data

US 2006/0028945 A1 Feb. 9, 2006

(51) Int. Cl.
*G11B 7/00* (2006.01)

(52) U.S. Cl. .................. 369/53.14; 369/3.3

(58) Field of Classification Search .......... 369/53.13, 369/53.14, 53.3
See application file for complete search history.

(56) References Cited

U.S. PATENT DOCUMENTS

| | | | |
|---|---|---|---|
| 4,710,908 A * | 12/1987 | Ohshima et al. ......... | 369/44.11 |
| 5,862,113 A * | 1/1999 | Tsuyuguchi et al. ..... | 369/53.18 |
| 5,963,517 A * | 10/1999 | Nakagaki et al. ........ | 369/53.14 |
| 6,351,440 B1 * | 2/2002 | Fukuda et al. ........... | 369/47.36 |
| 6,747,924 B1 * | 6/2004 | Muramatsu .............. | 369/44.29 |
| 6,865,141 B2 * | 3/2005 | Tada et al. ............... | 369/44.27 |
| 7,257,062 B2 * | 8/2007 | Li et al. ................... | 369/47.44 |
| 2001/0019524 A1 * | 9/2001 | Na ............................ | 369/53.14 |
| 2005/0013221 A1 * | 1/2005 | Sato ......................... | 369/47.44 |

* cited by examiner

*Primary Examiner*—Thang V. Tran
*Assistant Examiner*—Linh T. Nguyen
(74) *Attorney, Agent, or Firm*—Ladas and Parry LLP

(57) ABSTRACT

A digital signal processing device is provided for disc rotation control in an optical storage system, which is capable of generating a focusing error signal from light that was reflected by an optical disc loaded in the optical storage system. The digital signal processing device includes a low pass filter for removing a high-frequency component of the focusing error signal to obtain a filtered signal, a direct current level remover for removing a direct current component of the filtered signal to obtain a warp-indicating signal, and a controller for comparing the warp-indicating signal with a predetermined threshold value to determine extent of warping of the optical disc. The controller functions to control the optical storage system so as to limit maximum rotation speed of the optical disc according to result of the comparison made by the controller.

10 Claims, 5 Drawing Sheets

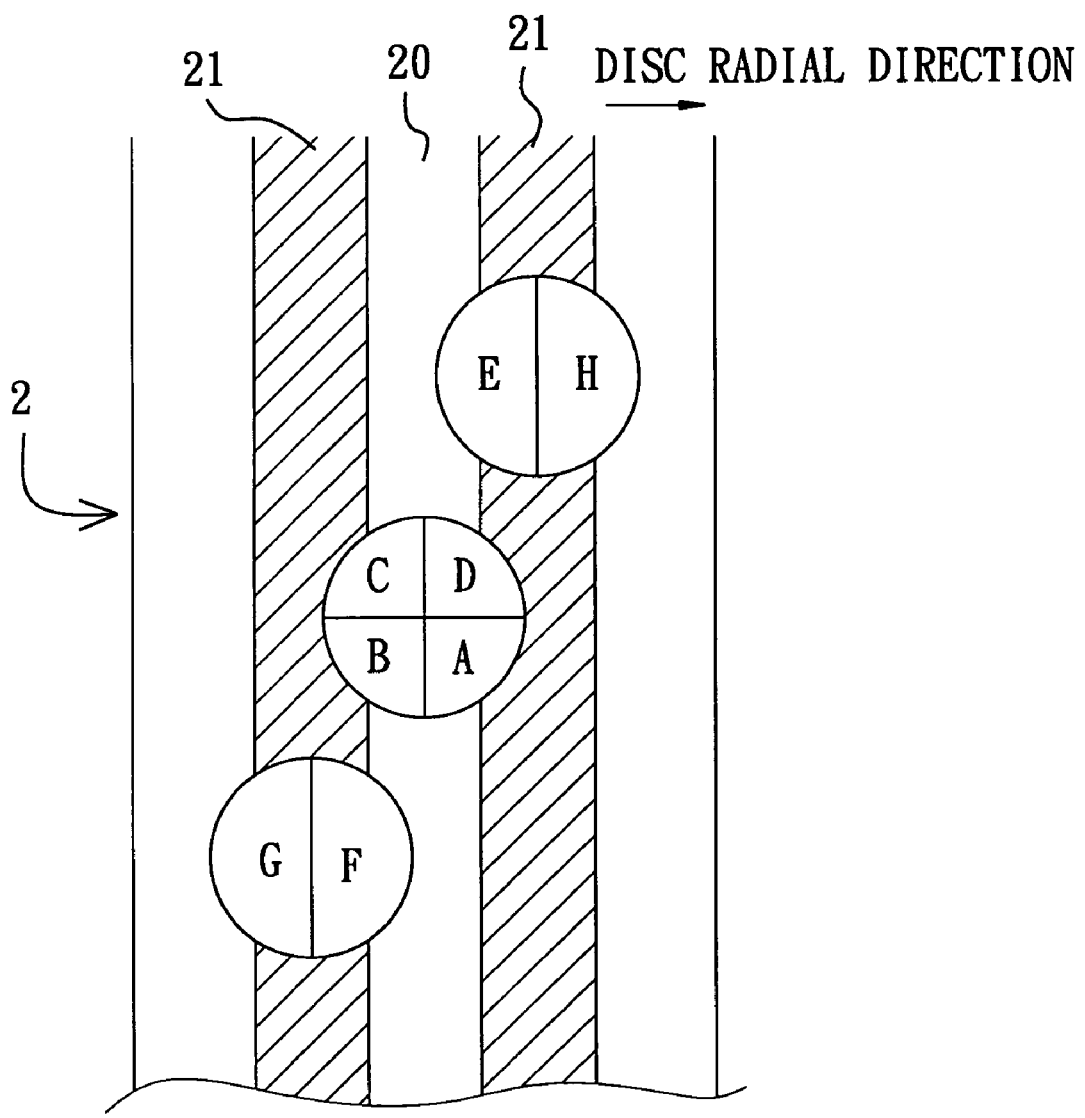
F I G. 3

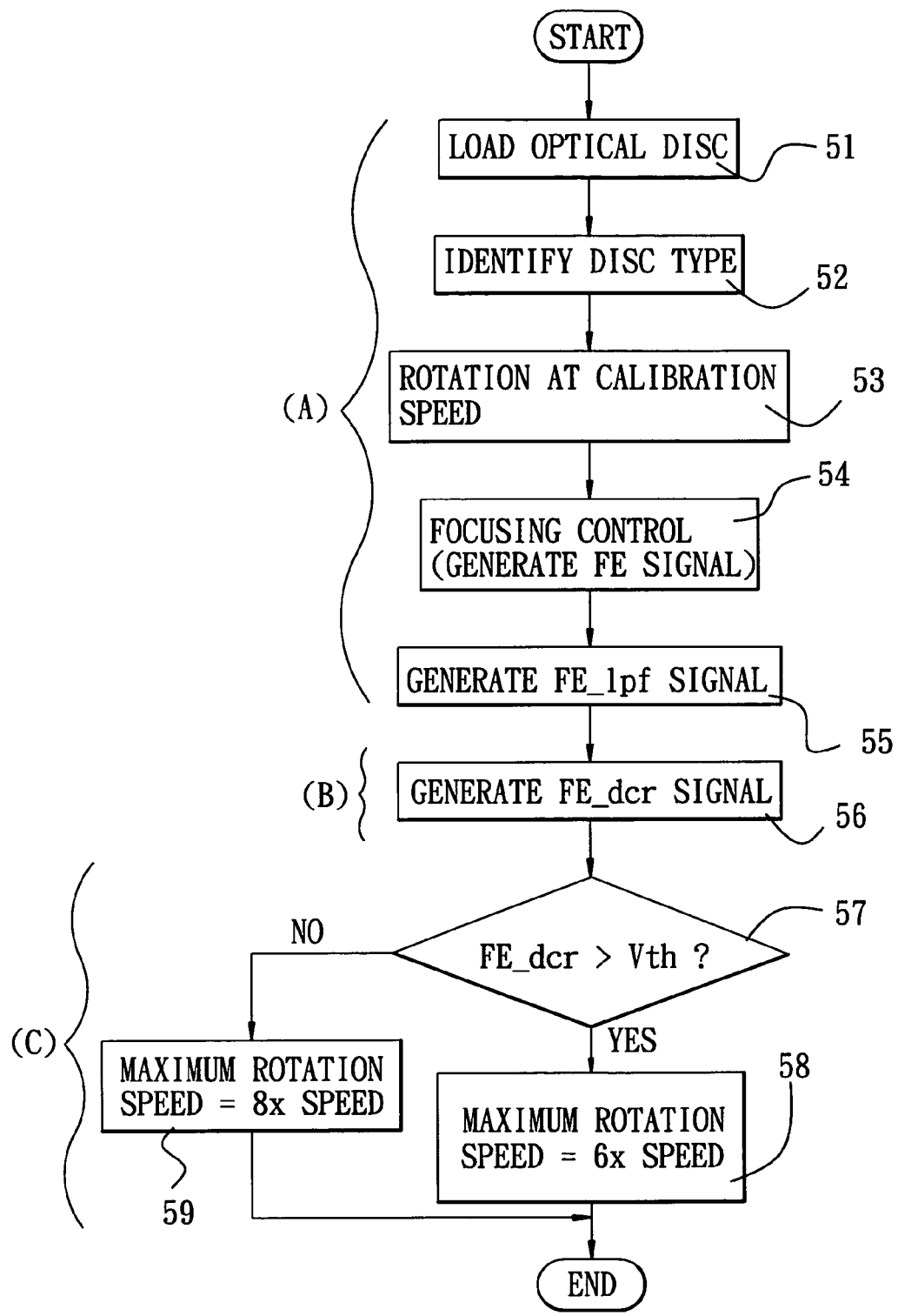
F I G. 4

METHOD AND DEVICE FOR DISC ROTATION CONTROL IN AN OPTICAL STORAGE SYSTEM BASED ON DETECTED EXTENT OF DISC WARPING

BACKGROUND OF THE INVENTION

1. Field of the Invention

The invention relates to a method and device for disc rotation control in an optical storage system, more particularly to a method and device for disc rotation control in an optical storage system based on detected extent of disc warping.

2. Description of the Related Art

An optical disc is prone to warp due to numerous factors, such as manufacturing errors, prolonged exposure to humidity or sunlight, applied forces or pressure, etc. As shown in FIG. 1, when loaded on a tray 40 of an optical storage system, a warped optical disc 2 will not lie flat on the tray 40. Hence, due to positional imbalance of the optical disc 2 relative to a rotary axis thereof, a lot of noise and vibrations will be generated during high-speed rotation of the optical disc 2. As a result, the service lives of a spindle motor and the associated servo mechanism of the optical storage system are shortened, and stability of disc recording and playback operations are adversely affected. Moreover, manufacturers are mandated to produce optical storage systems that comply with specified allowable noise and vibration levels during disc recording and playback operations.

SUMMARY OF THE INVENTION

Therefore, the object of the present invention is to provide a method and device for disc rotation control in an optical storage system based on detected extent of disc warping so as to overcome the aforesaid drawbacks of the prior art.

According to one aspect of the present invention, there is provided a method for disc rotation control in an optical storage system, which is capable of generating a focusing error signal from light that was reflected by an optical disc loaded in the optical storage system. The method comprises the steps of:

a) removing a high-frequency component of the focusing error signal to obtain a filtered signal;

b) removing a direct current component of the filtered signal to obtain a warp-indicating signal;

c) comparing the warp-indicating signal with a predetermined threshold value to determine extent of warping of the optical disc; and d) controlling the optical storage system so as to limit maximum rotation speed of the optical disc according to result of the comparison made in step c).

According to another aspect of the present invention, there is provided a digital signal processing device adapted for use in an optical storage system for disc rotation control. The optical storage system is capable of generating a focusing error signal from light that was reflected by an optical disc loaded in the optical storage system. The digital signal processing device comprises a low pass filter, a direct current level remover, and a controller. The low pass filter is adapted for removing a high-frequency component of the focusing error signal to obtain a filtered signal. The direct current level remover is coupled to the low pass filter, and removes a direct current component of the filtered signal to obtain a warp-indicating signal. The controller is coupled to the direct current level remover, compares the warp-indicating signal with a predetermined threshold value to determine extent of warping of the optical disc, and is adapted to control the optical storage system so as to limit maximum rotation speed of the optical disc according to result of the comparison made by the controller.

BRIEF DESCRIPTION OF THE DRAWINGS

Other features and advantages of the present invention will become apparent in the following detailed description of the preferred embodiment with reference to the accompanying drawings, of which:

FIG. 3 is a schematic diagram to illustrate how a focusing error signal is generated in a conventional manner;

FIG. 4 is a flowchart illustrating the preferred embodiment of a method for disc rotation control in an optical storage system according to the present invention.

DETAILED DESCRIPTION OF THE PREFERRED EMBODIMENT

Figure 1:
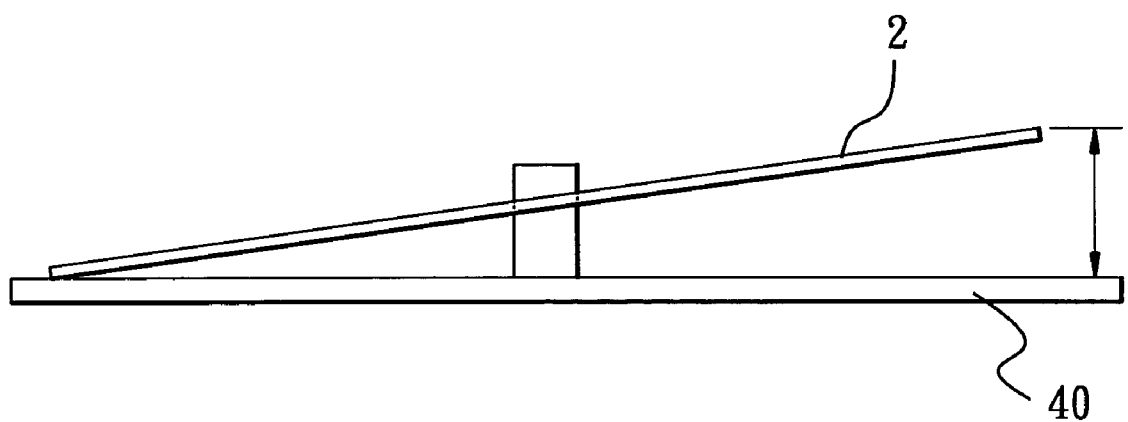
FIG. 1 is a schematic diagram illustrating a warped optical disc loaded on a tray of an optical storage system.
Figure 2:
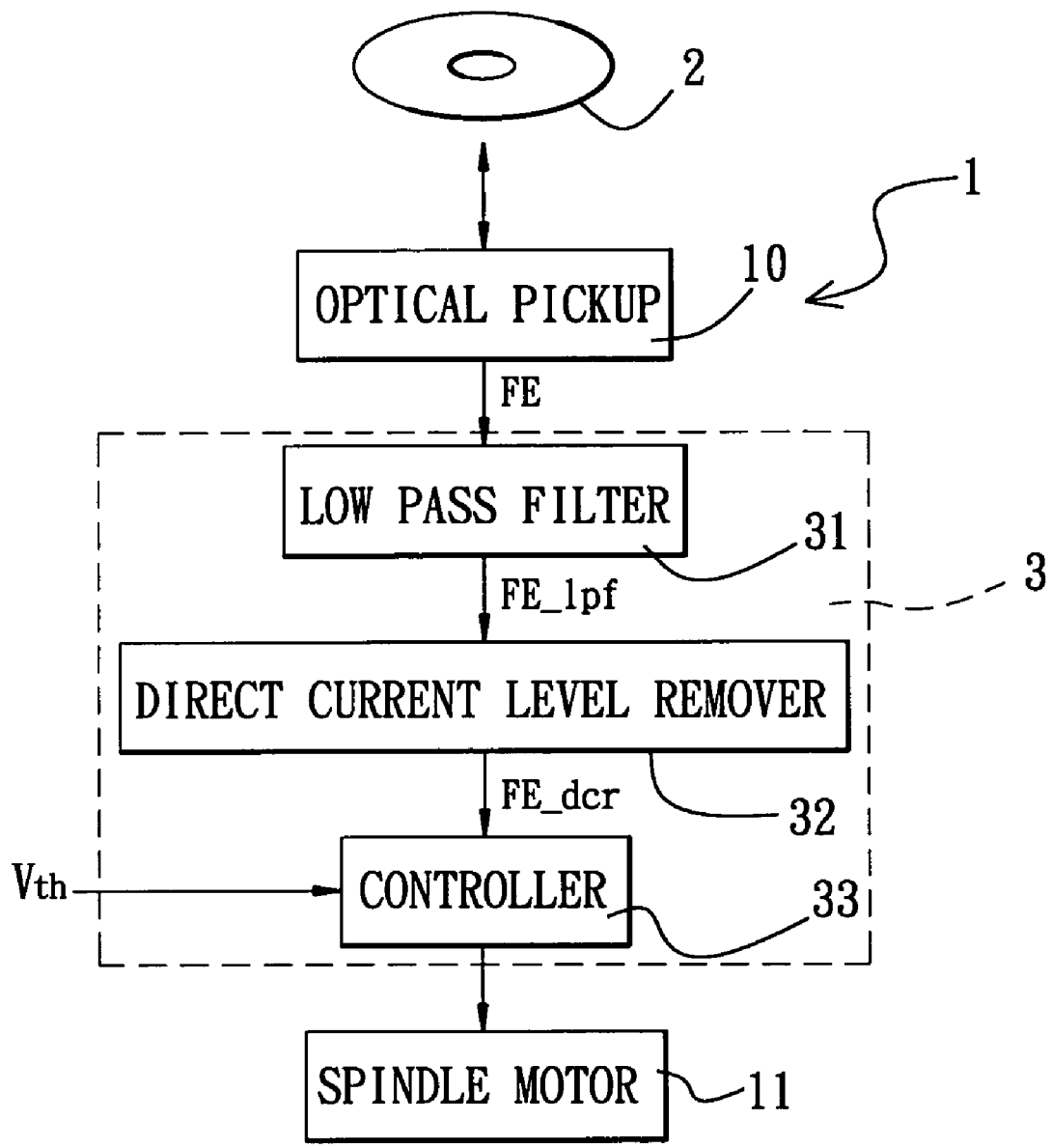
FIG. 2 is a schematic block diagram to illustrate the preferred embodiment of a digital signal processing device according to the present invention, together with an optical pickup and a spindle motor of an optical storage system.

Referring to FIG. 2, the preferred embodiment of a digital signal processing device 3 according to the present invention is shown to be coupled to an optical pickup 10 and a spindle motor 11 of an optical storage system 1.

The optical pickup 10, which is conventional in construction, includes a photo detector that has light beam detecting components (A), (B), (C), (D), (E), (F), (G), (H) positioned and operating in relation to land regions 21 and pit regions 20 on the optical disc 2, as best shown in FIG. 3. Particularly, when the light beam detecting components (A), (B), (C), (D) detect a pit region 20 of the optical disc 2, the light beam detecting components (E), (F) detect the same pit region 20, whereas the light beam detecting components (G), (H) detect the adjacent land regions 21. The sum (A+B+C+D) of light detected by the light beam detecting components (A), (B), (C), (D) is commonly referred to as a main beam, and the focusing error (FE) signal is the result of (A+C)−(B+D). The FE signal generated for a normal optical disc 2 under focused conditions is a direct current signal having a fixed level. However, when the optical disc 2 is warped, the FE signal generated under focused conditions will not have a fixed level, and will instead vary in a sinusoidal manner.

The digital signal processing device 3 detects the extent of warping of the optical disc 2 from the FE signal, and controls the spindle motor 11 to limit the rotation speed of the optical disc 2 accordingly. As shown in FIG. 2, the digital signal processing device 3 includes a low pass filter (LPF) 31, a direct current (DC) level remover 32, and a controller 33.

Figure 5A:
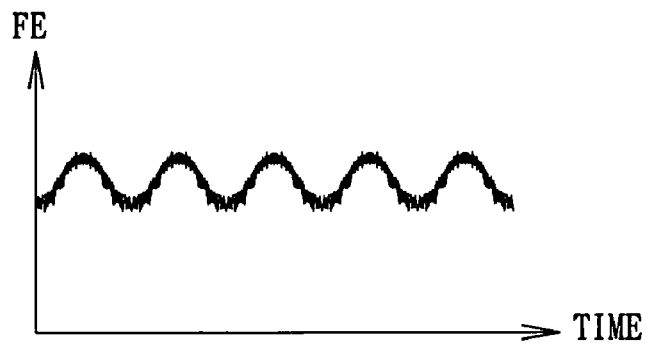
FIGS. 5a to 5c illustrate an exemplary focusing error signal, a filtered signal obtained from the focusing error signal, and a warp-indicating signal obtained from the filtered signal, respectively.
Figure 5B:
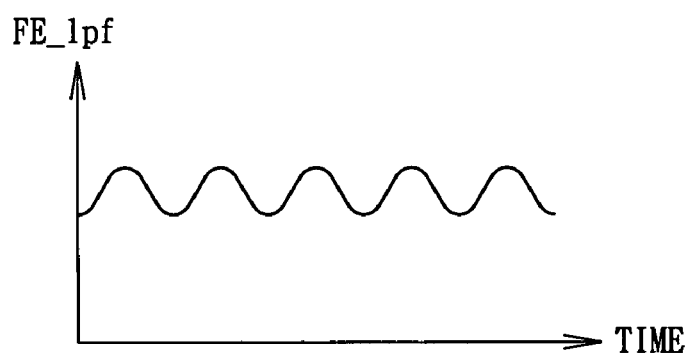

The LPF 31 is adapted for removing a high-frequency component of the FE signal (see FIG. 5a) to obtain a filtered signal (FE_lpf) (see FIG. 5b).

Figure 5C:
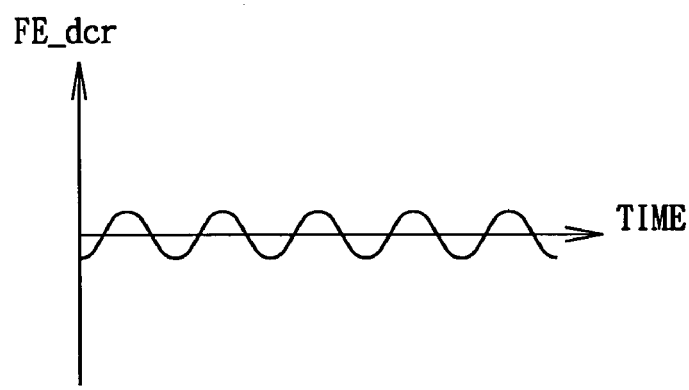

The DC level remover 32 is coupled to the LPF 31, and is used to remove a DC component of the filtered signal (FE_lpf) to obtain a warp-indicating signal (FE_dcr) (see FIG. 5c).

The controller 33 is coupled to the DC level remover 32, and compares the warp-indicating signal (FE_dcr) with a predetermined threshold value (Vth) to determine extent of warping of the optical disc 2. The controller 33 is adapted to control the spindle motor 11 so as to limit the maximum rotation speed of the optical disc 2 according to result of the comparison made by the controller 33.

Referring to FIG. 4, the preferred embodiment of a method for disc rotation control in the optical storage system 1 according to the present invention is shown to include the following stages:

Stage (A): In step 51, the optical disc 2 is loaded in the optical storage system 1. In step 52, the optical storage system 1 identifies the type of the optical disc 2 (e.g., ROM/−R/−RW/+R/+RW/RAM), and proceeds with corresponding servo control in a manner well known in the art. Then, in step 53, the optical storage system 1 is operated such that the spindle motor 11 drives the optical disc 2 to rotate at a low calibration speed (for instance, 4× speed), and focusing control is subsequently performed in step 54. At this moment, the FE signal (see FIG. 5a) is generated from the outputs of the light beam detecting components (A), (B), (C), (D) in a known manner as described hereinabove. Thereafter, in step 55, the FE signal is processed by the LPF 31 of the digital signal processing device 3 so as to obtain the filtered signal (FE_lpf) (see FIG. 5b). In this embodiment, the cut-off frequency of the LPF 31 is chosen to correspond with the low calibration speed. For example, when the low calibration speed is set to 4× speed, the actual speed of the spindle motor 11 is 2400 RPM (=40 Hz), and the cut-off frequency of the LPF 31 is thus chosen to be about 40 Hz.

Stage (B): In step 56, the filtered signal (FE_lpf) is processed by the DC level remover 32 so as to obtain the warp-indicating signal (FE_dcr). As shown in FIG. 5c, only the alternating current component of the filtered signal (FE_lpf) remains in the warp-indicating signal (FE_dcr).

Stage (C): In step 57, the controller 33 receives the warp-indicating signal (FE_dcr) from the DC level remover 32, and compares the same with a predetermined threshold value (Vth) to determine extent of warping of the optical disc 2. In this embodiment, the predetermined threshold value (Vth) is obtained from the LPF 31 and the DC level remover 32 by conducting Stages (A) and (B) using a reference optical disc 2 having a predetermined extent of warping (for instance, 1.0 mm). In step 57, if the amplitude of the warp-indicating signal (FE_dcr) is larger than the predetermined threshold value (Vth), the controller 33 deems the optical disc 2 to be a warped disc, and the flow goes to step 58. Otherwise, the controller 33 deems the optical disc 2 to be a normal disc (i.e., the extent of disc warping is within a tolerable range), and the flow goes to step 59.

In step 58, in response to a command for increasing the motor speed, the controller 33 controls the spindle motor 11 of the optical storage system 1 to limit the maximum rotation speed of the optical disc 2 (for instance, the maximum rotation speed is limited to 6× speed instead of an allowable maximum operating speed of 8× speed).

In step 59, in response to the command for increasing the motor speed, the controller 33 controls the spindle motor 11 to rotate the optical disc 2 at the allowable maximum operating speed of 8× speed.

In sum, by generating the warp-indicating signal (FE_dcr) from the FE signal for subsequent comparison with a predetermined threshold value (Vth) to determine the extent of warping of the optical disc 2, and by limiting the maximum rotation speed of the optical disc 2 according to the result of the comparison, disc rotation control in the present invention makes it possible to reduce noise and vibrations to acceptable levels, prolong the service lives of the spindle motor 11 and the associated servo mechanism of the optical storage system 1, and improve stability of the disc recording and playback operations.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for disc rotation control in an optical storage system, the optical storage system being capable of generating a focusing error signal from light that was reflected by an optical disc loaded in the optical storage system, said method comprising the steps of:
   a) removing a high-frequency component of the focusing error signal to obtain a filtered signal;
   b) removing a direct current component of the filtered signal to obtain a warp-indicating signal;
   c) comparing the warp-indicating signal with a predetermined threshold value to determine extent of warping of the optical disc; and
   d) controlling the optical storage system so as to limit maximum rotation speed of the optical disc according to result of the comparison made in step c).

2. The method of claim 1, wherein, in step a), the focusing error signal is generated while the optical storage system is operated to rotate the optical disc at a low speed.

3. The method of claim 1, wherein, in step a), the high-frequency component is removed using a low pass filter having a cut-off frequency that is dependent upon rotation speed of a spindle motor of the optical storage system.

4. The method of claim 1, wherein:
   in step c), the optical disc is deemed to be a warped disc when the amplitude of the warp-indicating signal is larger than the predetermined threshold value; and
   in step d), the optical storage system is controlled so as to limit the maximum rotation speed of the optical disc when the optical disc is determined to be a warped disc in step c).

5. The method of claim 1, wherein, in step c), the predetermined threshold value is obtained by performing steps a) and b) using a reference optical disc having a predetermined extent of warping.

6. A digital signal processing device adapted for use in an optical storage system for disc rotation control, the optical storage system being capable of generating a focusing error signal from light that was reflected by an optical disc loaded in the optical storage system, said digital signal processing device comprising:
   a low pass filter adapted for removing a high-frequency component of the focusing error signal to obtain a filtered signal;
   a direct current level remover coupled to said low pass filter for removing a direct current component of the filtered signal to obtain a warp-indicating signal; and
   a controller coupled to said direct current level remover for comparing the warp-indicating signal with a predetermined threshold value to determine extent of warping of the optical disc;

said controller being adapted to control the optical storage system so as to limit maximum rotation speed of the optical disc according to result of the comparison made by said controller.

7. The digital signal processing device of claim 6, wherein said low pass filter is adapted to receive the focusing error signal from a photodetector of the optical storage system while the optical storage system is operated to rotate the optical disc at a low speed.

8. The digital signal processing device of claim 6, wherein said low pass filter has a cut-off frequency that is dependent upon rotation speed of a spindle motor of the optical storage system.

9. The digital signal processing device of claim 6, wherein said controller deems the optical disc to be a warped disc when the amplitude of the warp-indicating signal is larger than the predetermined threshold value, and controls the optical storage system so as to limit the maximum rotation speed of the optical disc when said controller determines the optical disc to be a warped disc.

10. The digital signal processing device of claim 6, wherein the predetermined threshold value is obtained from said low pass filter and said direct current level remover using a reference optical disc having a predetermined extent of warping.

* * * * *